United States Patent
Enzenhofer et al.

(10) Patent No.: US 10,022,651 B2
(45) Date of Patent: Jul. 17, 2018

(54) DEVICE AND METHOD FOR THE CONTACT OF A GAS PHASE WITH A LIQUID MEDIUM

(71) Applicants: Matthias Enzenhofer, Heilbronn (DE); Siegfried Gruber, Rheda-Wiedenbruck (DE)

(72) Inventors: Matthias Enzenhofer, Heilbronn (DE); Siegfried Gruber, Rheda-Wiedenbruck (DE)

(*) Notice: Subject to any disclaimer, the term of this patent is extended or adjusted under 35 U.S.C. 154(b) by 281 days.

(21) Appl. No.: 15/034,284

(22) PCT Filed: Oct. 28, 2014

(86) PCT No.: PCT/EP2014/073101
§ 371 (c)(1),
(2) Date: Jun. 8, 2016

(87) PCT Pub. No.: WO2015/063076
PCT Pub. Date: May 7, 2015

(65) Prior Publication Data
US 2016/0296857 A1    Oct. 13, 2016

(30) Foreign Application Priority Data
Nov. 4, 2013   (DE) .................. 10 2013 222 343

(51) Int. Cl.
*B01D 47/00*   (2006.01)
*B01D 19/00*   (2006.01)
(Continued)

(52) U.S. Cl.
CPC ......... *B01D 19/0052* (2013.01); *B01D 1/227* (2013.01); *B01D 3/346* (2013.01); *B01D 19/0005* (2013.01); *B01D 2259/10* (2013.01)

(58) Field of Classification Search
None
See application file for complete search history.

(56) References Cited

U.S. PATENT DOCUMENTS

| 3,737,378 A | 6/1973 | Mori et al. |
| 4,276,124 A | 6/1981 | Mock |
| (Continued) | | |

FOREIGN PATENT DOCUMENTS

| DE | 1117051 | 11/1961 |
| DE | 1262908 | 3/1968 |
| GB | 548281 | 10/1942 |

OTHER PUBLICATIONS

Search Report.

*Primary Examiner* — Amber R Orlando
*Assistant Examiner* — Phillip Y Shao
(74) *Attorney, Agent, or Firm* — Alix, Yale & Ristas, LLP

(57) ABSTRACT

A device for the contact of a gas phase with a liquid medium, and a method for operating the device. The liquid medium here is directed into the device and some of it is raised by means of a conveying device. The liquid medium raised is distributed over a rotating brush by way of a distributing means. At least one gas inlet and a fan here generate a gas stream from a lower portion of the device to an upper portion of the device. The liquid medium distributed over the upper surface of the brush is directed back by way of the brush, counter to the gas stream, into the lower region.

20 Claims, 1 Drawing Sheet

(51) Int. Cl.
*B01D 1/22* (2006.01)
*B01D 3/34* (2006.01)

(56) References Cited

U.S. PATENT DOCUMENTS 4,867,849 A    9/1989  Coda et al.
5,741,397 A *  4/1998  Kraver .................. A61C 17/046
                                                159/25.2

* cited by examiner

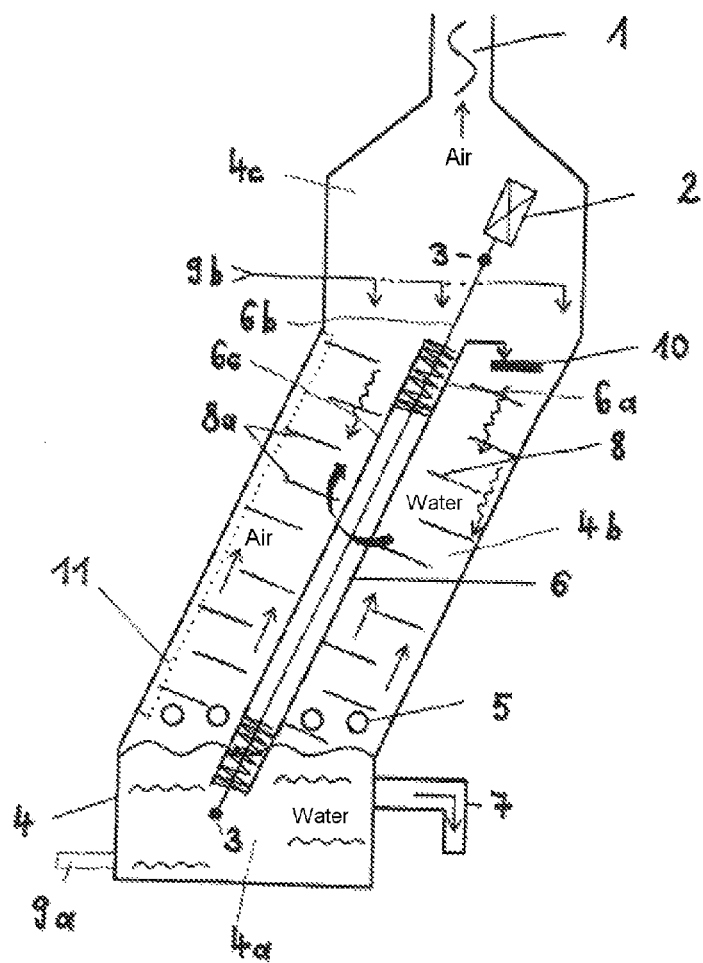

DEVICE AND METHOD FOR THE CONTACT OF A GAS PHASE WITH A LIQUID MEDIUM

BACKGROUND

The invention relates to a device for the contact of a gas phase with a liquid medium, and to a method for operating the device.

The contact of a gas phase with a liquid medium can be used, in practice, in many fields. For example, the contact of a gas phase with a liquid can be used in order to remove volatile substances from a liquid. This makes it possible for example, on the one hand, for the liquid to be cleaned and, on the other hand, for the volatile components dissolved in the liquid to be collected and, for example following regeneration, to be reused.

The removal of volatile components from a liquid can take place in a conventional manner for example by distillation. In this case, a liquid containing, in addition to a component of relatively low volatility, at least one more highly volatile component is heated, and therefore it is predominantly the more highly volatile component which evaporates, whereas the component of relatively low volatility remains. The evaporated, more highly volatile component can be recovered in the form of a liquid from the vapor phase by means of cooling. The disadvantage of such a distillation method is the amount of time and energy required for it.

As an alternative, it is also possible for volatile components to be removed from a liquid by means of a fixed-bed installation. The liquid here is directed via a fixed bed, e.g. a packed column. Gas, e.g. air, is introduced in counterflow through the fixed bed in order for the volatile component to be separated off. The disadvantage with such an arrangement is that the fixed-bed installation can become encrusted with precipitating solids and the installation requires high-outlay measures in order to be free of the encrustations, so as to restore functional capability of the installation.

The contact of a gas phase with a liquid medium can also be used, for example, to moisten the gas with the liquid medium. In specific terms, it is thus possible to moisten for example air with water in order to create more pleasant climatic conditions in a room. In order for the air to be moistened sufficiently at room temperature, a large evaporation surface area is required, and this is not usually available.

SUMMARY

Briefly stated, a device for the contact of a gas phase with a volatile medium comprises:
a housing having a lower region, a central region and an upper region;
at least one gas inlet;
a fan;
at least one first inflow for the liquid medium;
at least one outflow, which is arranged in the lower region;
a conveying device, which is suitable for raising some of the liquid medium from the lower region; and
a brush, which comprises bristles and can be rotatable, wherein the at least one gas inlet and the fan are suitable for generating a gas stream from a lower portion of the device to an upper portion of the device; and
a distributing means is provided in the upper region of the housing, said distributing means being suitable for distributing over the brush the liquid medium which has been raised by the conveying device.

In one embodiment, the conveying device is designed in the form of an Archimedean screw, wherein the brush is fitted on the conveying device and can be rotated therewith. As an alternative, the conveying device may contain some other pumping device.

In a preferred embodiment, the central region of the housing is rotationally symmetrical, particularly preferably cylindrical.

In an advantageous embodiment, the device comprises at least one second inflow for the liquid medium.

The device advantageously also comprises at least one drive, which is suitable for driving the conveying device and for rotating the brush.

In a preferred embodiment, the device, in the central region, has at least one part which projects in the direction of the conveying device and is designed such that at least part of it comes into contact with the brush.

The bristles preferably consist of an elastic material. In a preferred embodiment of the invention, the bristles have a porous surface. In a further advantageous embodiment, the device has bristles which are hollow. The brush and the conveying device here are particularly advantageously designed such that the hollow bristles are supplied, at least in part, with the liquid medium from the conveying device.

A method for the contact of a gas phase with a liquid medium, has one of the devices described above and comprises the following steps:
directing the liquid medium into the device;
raising some of the liquid medium collected in the lower region;
distributing the raised liquid medium over the brush, wherein the brush rotates;
the at least one gas inlet and the fan generate a gas stream from a lower portion of the device to an upper portion of the device; and
the liquid medium distributed over the upper surface of the brush is directed back by way of the brush, counter to the gas stream, into the lower region.

The liquid medium passes into the upper region of the device via the conveying device and is distributed over the brush by way of the distributing means. The rotary drive for the conveying device preferably simultaneously causes the brush to rotate. The distributed liquid moves back into the lower region of the device on account of gravitational force and wets the bristles of the brush in the process. The bristles here serve as an evaporation surface for the liquid medium.

The above conveying device straightforwardly allows volatile components to be separated off from the liquid medium, since the individual bristles of the brush are wetted by the liquid medium and thus serve as an evaporation surface for the liquid medium. It is therefore the case that there is a very large surface area available for the separation of volatile components from the liquid medium.

In contrast to the conventional fixed-bed installations, the elasticity of the bristles gives rise to only small amounts of encrustation, if any at all, as a result of solids precipitating on the bristles. Providing in a central region of the housing at least one part which projects in the direction of the axle and is designed such that at least part of it comes into contact with the brush makes it possible, in addition, for the bristles to be made to move, and the encrustation of the brush can be reduced further.

Providing the brush and the rotary movement thereof makes it possible for the liquid medium introduced into the device to have a longer residence time than, for example, in conventional fixed-bed installations. More thorough removal of volatile components from the liquid medium can thus be achieved. Providing at least one part which projects in the direction of the conveying device makes it possible, in addition, to generate, by way of the movement of the bristles, a fine mist from the liquid medium, said mist forming an additional evaporation surface area for the volatile components dissolved in the liquid medium. The removal of volatile components from the liquid medium can thus be further improved.

The above device can likewise be used to moisten a gas stream effectively, since the individual bristles of the brush provide a large evaporation surface area and the air stream which is directed through the brush can entrain the evaporated liquid medium. The device can advantageously be used for moistening air with water in order to create for example pleasant climatic conditions in a room.

Providing the brush and the rotary movement thereof provides the liquid medium introduced into the device with a long residence time, and the gas stream introduced can thus be moistened effectively. Providing at least one part which projects in the direction of the conveying device makes it possible, in addition, to generate, by way of the movement of the bristles, a fine mist from the liquid medium, said mist forming an additional evaporation surface area for the liquid medium and thus allowing a higher level of saturation of the gas with the liquid medium.

BRIEF DESCRIPTION OF THE DRAWING

Further properties and advantages of the device and the method will be made clear by way of the following description of specific embodiments, with reference being made to the drawing. In the latter, the FIGURE shows a schematic illustration of one embodiment of the device.

DETAILED DESCRIPTION

The device shown in the FIGURE comprises a housing 4 having a lower region 4*a*, a central region 4*b* and an upper region 4*c*. The central region 4*b* here is tilted in relation to the lower region 4*a* and the upper region 4*c*. The housing also has gas inlets 5 and is open at the upper end, and it is therefore possible to provide a fan 1 in order to generate a gas stream from the gas inlets 5 to the upper region 4*c* of the device. The gas used may be, for example, air, but also any other gas or gas mixture.

In the advantageous embodiment shown, the device has a plurality of first inflows 9*b*, which are arranged above a brush 8. This means that the housing 4 is also wetted in the central region 4*b* with the liquid medium introduced, and serves as an evaporation surface for said medium. The device also has, in the lower region 4*a*, a second inflow 9*a* for the liquid medium, for example water or an absorbent, and an outflow 7.

The brush 8 is fitted on a tube 6*c* of a conveying device 6, which is designed in the form of an Archimedean screw, and comprises bristles 8*a*. The bristles 8*a* here preferably consist of an elastic material and particularly preferably have porous surfaces. It is also possible here for the bristles 8*a* to be hollow.

The Archimedean screw 6 runs parallel to the central region 4*b* of the device and comprises, in addition to the tube 6*c*, a worm 6*a* and a drive axle 6*b*, which can be driven by a motor 2 and is mounted in a rotatable manner by means of bearing 3. Both the worm 6*a* and the tube 6*c* can be rotated by the axle 6*b*. Since the brush 8 is fitted on the tube 6*c* of the Archimedean screw 6, said brush can also be rotated. It is not imperative, however, for the conveying device to be designed in the form of an Archimedean screw. It is also possible to use, for example, a conveying device which contains some other pumping device.

A liquid medium is directed into the lower region 4*a* of the device via the inflow 9*b* and optionally via the further, second inflow 9*a*. In a second step, the liquid medium collected in the lower region 4*a* is raised by means of the Archimedean screw 6 and fed to a distributing means 10, which is arranged in the upper region 4*c* of the housing 4. The distributing means 10 here distributes the raised liquid medium over the upper surface of the brush 8, and therefore the liquid medium is directed back into the lower region 4*a*, on account of gravitational force, by way of the brush 8.

The rotary movement of the Archimedean screw 6 at the same time also causes the brush 8 to rotate. In addition, the fan 1 and the gas inlets 5 generate a gas stream from the gas inlets 5 to the upper region 4*c* of the device.

The surfaces of the individual bristles 8*a* of the brush 8 are wetted by the liquid medium distributed over the upper surface of the brush 8 and serve as an evaporation surface for the liquid medium. While the device is constructed in compact form, it is thus possible for the area of the evaporation surface to be increased by a multiple in relation to the surface area of the liquid medium collected in the lower region 4*a* of the device. This makes possible, for example, more thorough removal of volatile substances from the liquid medium. It is likewise thereby possible for the gas stream to be moistened effectively with the liquid medium and for the device to be used for moistening, for example, air.

As the brush 8 rotates, the bristles 8*a* scrape over the surface of the central region 4*b* of the housing 4. The elasticity of the bristles 8*a* and the continuous movement of the bristles 8*a* result in only very small amounts of encrustation of the bristles, if any at all, as a result of solids precipitating from the liquid medium, as a result of which the amount of maintenance required for the device is reduced to a minimum in relation to, for example, a fixed-bed installation. The encrustation can be reduced, in addition, by providing in the central region 4*b* of the housing 4 at least one part 11 which projects in the direction of the axle 6*b*, since at least part of the projecting part 11 comes into contact with the bristles 8*a* of the brush 8 and encourages these, in addition, to oscillate. The oscillating movement of the bristles 8*a* gives rise, in addition, to a fine liquid-medium droplet mist, which forms an additional evaporation surface area for the liquid medium.

Providing the at least one projecting part 11 thus makes possible even more thorough removal of the volatile substances from the liquid medium. The liquid medium freed of the volatile substances moves back into the lower region 4*a* of the device on account of gravitational force and can be directed away via the outflow 7.

During use for moistening gas or gas mixtures, the saturation of the gas with the liquid medium can be further increased in this way. For the purpose of increasing the saturation level, it is also possible, in addition, to heat the gas introduced into the device. It is likewise possible to heat the liquid medium, in order to promote evaporation of the liquid medium.

In a further-reaching advantageous embodiment of the device, the body of the brush 8 and the tube 6*c* may be made in one piece. The tube 6*b* serves as a body for the brush 8, and the bristles 8*a* are fitted directly on the tube 6*c*. It is particularly advantageous here if the bristles 8*a* are hollow and the tube 6*c* is designed such that the bristles 8*a* can be supplied directly with the liquid medium conveyed in the Archimedean screw 6. It is thus possible, on the one hand, in addition for liquid medium to be applied to the housing wall 4 in the central region 4*b*, as a result of which said central region becomes the evaporation surface for the liquid medium, and, on the other hand, in the case of the projecting part 11 being provided, for an additional fine droplet mist to be generated. This makes possible, for example, particularly thorough removal of volatile components from the volatile medium. It is thus also possible for the saturation of gas or gas mixtures with the liquid medium to be further increased.

The gas blown out on the upper side of the device by the fan 1 may contain, for example, volatile components which have been separated from the liquid medium, and it is possible for these components to be collected and then, for example, regenerated, reused or disposed of.

It is likewise possible for the gas or gas mixture blown out on the upper side of the device by the fan 1 to be mixed with the evaporated liquid medium and, in the case of air moistened with water, to be used for example for creating pleasant climatic conditions in a room.

The invention claimed is:

1. A device for the contact of a gas phase with a liquid medium, comprising the following:

- a housing, having a lower region, a central region and an upper region;
- at least one gas inlet;
- a fan;
- at least one first inflow for the liquid medium;
- at least one outflow, which is arranged in the lower region;
- a conveying device, which is suitable for raising some of the liquid medium from the lower region; and
- a rotatable brush, which comprises bristles;
- wherein the at least one gas inlet and the fan are suitable for generating a gas stream from a lower portion of the device to an upper portion of the device; and
- a distributing means is provided in the upper region of the housing, said distributing means being suitable for distributing over the brush the liquid medium which is raised by the conveying device.

2. The device as claimed in claim 1, wherein the conveying device is designed in the form of an Archimedean screw and the brush is fitted on the conveying device and can be rotated therewith.

3. The device as claimed in claim 1, wherein the central region of the housing is essentially rotationally symmetrical and the brush is fitted in a rotatable manner into the central region of the housing.

4. The device as claimed in claim 1, wherein the device comprises at least one second inflow for the liquid medium.

5. The device as claimed in claim 1, wherein the device also comprises at least one drive, which is suitable for driving the conveying device and/or rotating the brush.

6. The device as claimed in claim 1, wherein the device, in the central region, has at least one part which projects in the direction of the conveying device and is designed such that at least part of it comes into contact with the brush.

7. The device as claimed in claim 1, wherein the bristles consist of an elastic material.

8. The device as claimed in claim 1, wherein the bristles have a porous surface.

9. The device as claimed in claim 1, wherein the bristles are hollow.

10. The device as claimed in claim 9, wherein the brush and the conveying device (6) are designed such that the bristles are supplied, at least in part, with the liquid medium from the conveying device.

11. A method for the contact of a gas phase with a liquid medium, having a device as claimed in claim 1 and comprising the following steps:

- directing the liquid medium into the device;
- raising some of the liquid medium collected in the lower region; and
- distributing the raised liquid medium over the brush, wherein the brush rotates;
- the at least one gas inlet and the fan generate a gas stream from a lower portion of the device to an upper portion of the device; and the liquid medium distributed over the brush is directed back by way of the brush, counter to the gas stream, into the lower region.

12. The method as claimed in claim 11, wherein the brush rotates together with the conveying device.

13. The device as claimed in claim 1, wherein the central region of the housing is cylindrical and the brush is fitted in a rotational manner into the central region of the housing.

14. The device as claimed in claim 2, wherein the central region of the housing is essentially rotationally symmetrical and the brush is fitted in a rotatable manner into the central region of the housing.

15. The device as claimed in claim 2, wherein the device comprises at least one second inflow for the liquid medium.

16. The device as claimed in claim 3, wherein the device comprises at least one second inflow for the liquid medium.

17. The device as claimed in claim 13, wherein the device comprises at least one second inflow for the liquid medium.

18. The device as claimed in claim 2, wherein the device also comprises at least one drive, which is suitable for driving the conveying device and/or rotating the brush.

19. The device as claimed in claim 3, wherein the device also comprises at least one drive, which is suitable for driving the conveying device and/or rotating the brush.

20. The device as claimed in claim 4, wherein the device also comprises at least one drive, which is suitable for driving the conveying device and/or rotating the brush.

* * * * *